(No Model.)
H. B. ROBISCHUNG.
FULCRUM POST FOR BRAKE BEAMS.
No. 558,521. Patented Apr. 21, 1896.
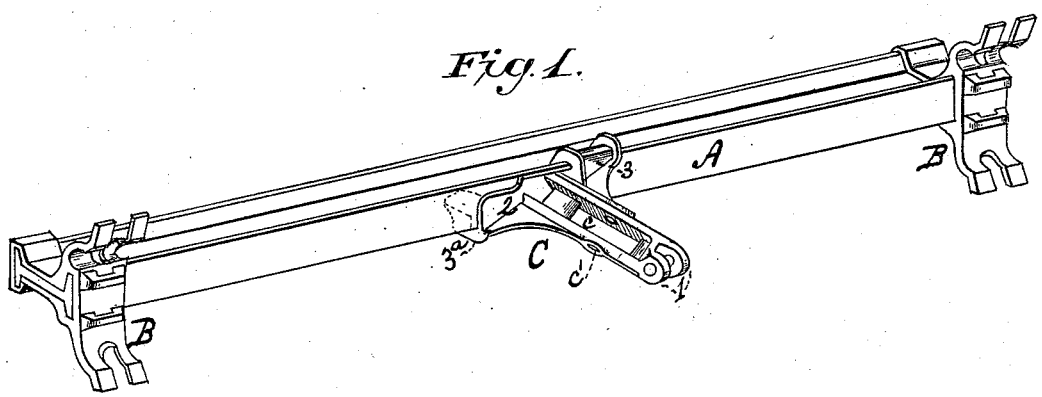
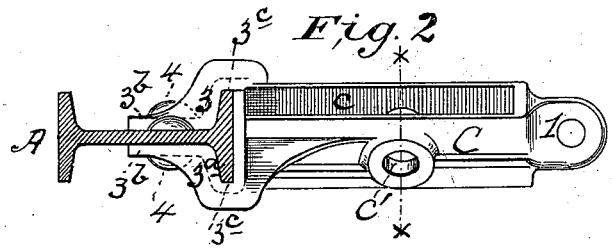
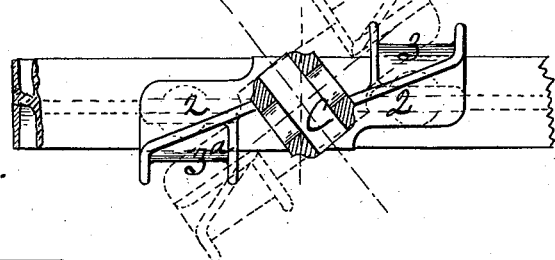
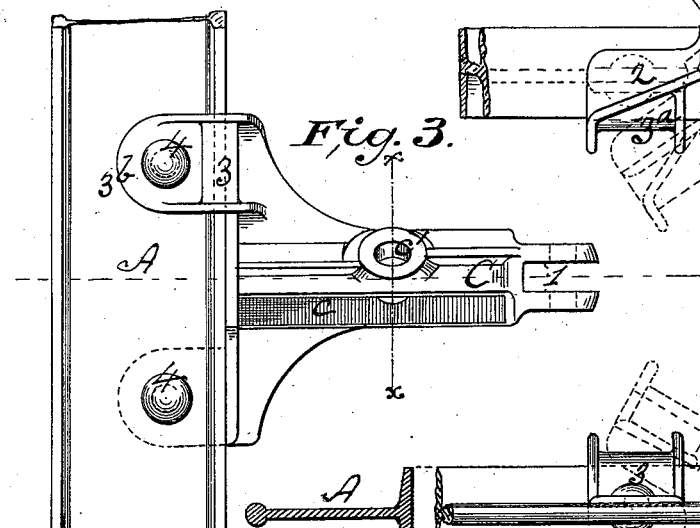
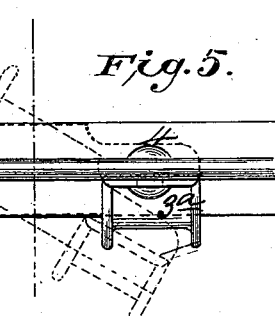

UNITED STATES PATENT OFFICE.

HENRY B. ROBISCHUNG, OF KALAMAZOO, MICHIGAN.

FULCRUM-POST FOR BRAKE-BEAMS.

SPECIFICATION forming part of Letters Patent No. 558,521, dated April 21, 1896.

Application filed September 11, 1895. Serial No. 562,179. (No model.)

*To all whom it may concern:*

Be it known that I, HENRY B. ROBISCHUNG, a citizen of the United States, residing at Kalamazoo, in the county of Kalamazoo, State of Michigan, have invented certain new and useful Improvements in Fulcrum-Posts for Brake-Beams; and I hereby declare the following to be a full, clear, and exact description of the same, reference being had to the accompanying drawings, in which—

Figure 1 is a perspective view of a brake-beam having applied thereto a fulcrum-post embodying my invention. Fig. 2 is an enlarged view thereof, the fulcrum-post being in side elevation and the beam in section. Fig. 3 is a top plan view of the fulcrum-post and a portion of the brake-beam. Fig. 4 is a front view of a portion of the beam and a sectional view of the fulcrum-post, taken on the line $xx$, Figs. 2 and 3, the full lines showing the position of the fulcrum-post with relation to the beam when attached thereto and the dotted lines indicating the position in applying or removing the fulcrum-post; and Fig. 5 is a rear view of a portion of a T-beam, showing the grip-lugs or curved ears of the fulcrum-post, the full and dotted lines indicating the same as in the preceding figure and showing how the grip-lugs or curved ears of the fulcrum-post clear the beam in applying or removing the post.

Like symbols refer to like parts wherever they occur.

My present invention relates to the construction of fulcrum-posts or fulcrum-blocks for attaching brake-levers to brake-beams, and also to the manner of detachably attaching the said fulcrum-blocks or fulcrum-posts to the beams, having for its object, first, the ready attachment, removal, and replacement of the fulcrum-post without disturbing the brake-heads or their connection with the beam; second, to increase the strength of the fulcrum-post; third, to avoid the use of fastenings at points which would tend to weaken the structure; and fourth, to distribute the torsional strains on the lines of greatest resistance. Heretofore, so far as I am aware, the fulcrum-post or fulcrum-block for this class of brake-beams has been attached to the beam either by slotting the post and slipping it over the end of the beam, which necessitates the removal and replacement of a brake-head whenever the fulcrum-post requires to be changed or renewed, or the post has been made in several sections, said sections formed to inclose the beam and bolted together through the web of the beam and between the beam and brake-lever, which results in bringing the torsional strains directly on the fastenings, greatly reducing the strength and life of the structure.

In order to secure the advantages hereinbefore noted and avoid the several disadvantages before pointed out, I provide the base of the fulcrum-post or fulcrum-block on opposite sides of its axial center with grip-lugs or ears so located or distanced as to permit the insertion of the beam between the lugs and adapted to engage the beam when the fulcrum post or block is turned in position and to be disengaged from or release the beam by the rotation of the fulcrum-post, and such a construction or its equivalent embodies the main feature of my invention.

As is well understood by those skilled in this art, the plane of the lever-slot of the fulcrum-post is at an angle to the plane of the beam, varying accordingly as a right or left hand lever is used. Therefore to obtain the best results the grip-lugs should so face that the twist of the brake-lever when power is applied will force the lugs against the beam and thus relieve the bolts or like fastenings of torsional strain, and to effect this the grip-lugs are preferably located in parallel planes which intersect the plane of the brake-lever or brake-lever slot, and such a construction or its equivalent embraces a secondary feature of my invention.

There are other minor features of invention, all as will hereinafter more fully appear.

I will now proceed to describe my invention more fully, so that others skilled in the art to which it appertains may apply the same.

In the drawings, A indicates the brake-beam, B B suitable brake-heads attached thereto in any desired manner, and C a fulcrum-post embodying my invention.

In the present instance an I (or H) beam has been chosen for purposes of illustration, and the fulcrum-post is shown as slotted for a right-hand lever; but it is to be understood that the beam may be of any desired cross-section and the lever-slot of the post arranged for a left-hand lever, if such is required, without departing from the spirit or scope of my invention.

The fulcrum-post C is slotted longitudinally, as at $c$, for the reception of the brake-lever and provided with pin-holes $c'$ for the fulcrum or pivot pin of said lever. In addition thereto the free end of the post is provided with perforated ears 1 1, to afford means of attachment for a third suspension-hanger, and the base of the post is provided with a base-plate 2 of a form which will adjust itself to the contour of beam A.

Projecting from the base-plate 2 (or base of the post) and in opposite directions from the post are grip-lugs 3 $3^a$, which are preferably curved, indented, or otherwise shaped to conform to the beam with which the post is to be used, and said lugs are located on opposite sides of the post in planes parallel with each other, which planes intersect the plane of the brake-lever or brake-lever slot of the post, (see dotted line $y\ y$, Fig. 4, and full edge line of brake-beam A,) and said lugs are also at such distance apart as will permit the beam to enter between them when the fulcrum-post (or its base-plate) is in the position indicated in dotted lines, Figs. 4 and 5, after which the rotation of the post to its normal position with relation to the beam (see full lines of the several figures of the drawings) will cause the lugs to grip the beam.

In case the beam is of T or H form in cross-section or composed of flanges connected by a web the grip-lugs should be recessed or indented to receive the (vertical) flange of the beam A, as at $3^c$, and extended parallel with the web, as at $3^b$, so that they may be bolted or riveted to the web, as at 4, and in every instance it is desirable that some means of fastening the grip-lugs to the beams be provided, the specific form of the lugs and nature of the attaching device being modified and adapted to the shape of the beam, all of which is within the province of the skilled mechanic. It is also desirable that the grip-lugs be integral with the base-plate and the base-plate with the fulcrum-post, as thereby great strength with lightness is obtained, and I prefer that the whole be formed as a single malleable casting, but do not herein limit my invention thereto.

For purposes of illustration the slotted fulcrum-post has been shown as adapted for a right-hand lever, and the grip-lugs 3 $3^a$ are so located on the base-plate 2 that the torsional strain on the brake-lever forces the grip-lugs against the beam. If, therefore, a left-hand lever and correspondingly-slotted fulcrum-post is used, it is obvious the torsional strain or twist will be reversed, and the position of the grip-lugs should also be reversed, as will be apparent to any skilled mechanic.

Having thus described my invention, what I claim, and desire to secure by Letters Patent, is—

1. A brake-beam fulcrum-post, provided on its base with grip-lugs arranged on opposite sides of the post and at such distance apart as will permit the entrance of the beam between the lugs, said lugs adapted to grip the brake-beam, when the post is rotated substantially as and for the purposes specified.

2. A brake-beam fulcrum-post, having a base-plate provided with oppositely-projecting curved or indented grip-lugs, said lugs located on opposite sides of the fulcrum-post and adapted to grip the beam, substantially as and for the purposes specified.

3. A brake-beam fulcrum-post, provided on its base with grip-lugs said lugs being located on opposite sides of the post, in parallel planes which intersect the plane of the brake-lever, and at a distance apart which will admit of the introduction of the beam laterally between the lugs, whereby the lugs will grip and bind on the beam when the post is rotated into its normal position, substantially as and for the purposes specified.

4. A fulcrum-post for brake-beams, said post having a base-plate provided with offset grip-lugs arranged on opposite sides of the post in parallel planes which intersect the plane of the brake-lever slot, and at such distance apart as will admit the lateral introduction of the beam between said grip-lugs, substantially as and for the purposes specified.

5. A fulcrum-post for brake-beams, said post provided on its base with grip-lugs located at points off the longitudinal axial center of the post and with an intervening space between said lugs which will admit the beam laterally between said lugs, substantially as and for the purposes specified.

6. A fulcrum-post for brake-beams, said post having a lever-slot $c$ and a base-plate 2 provided with grip-lugs 3, $3^a$ said lugs located on opposite sides of the plate from the post and off the axial center of the post; substantially as and for the purposes specified.

In testimony whereof I affix my signature, in presence of two witnesses, this 6th day of September, 1895.

HENRY B. ROBISCHUNG.

Witnesses:
E. B. LEIGH,
E. T. WALKER.